United States Patent
Margraff et al.

[11] 3,907,755
[45] Sept. 23, 1975

[54] SULFONATED POLYMERS DERIVED FROM L-LYSINE

[75] Inventors: Rodolphe Margraff, Ris-Orangis; Guy Bourat, Bourg-la-Reine, both of France

[73] Assignee: Rhone-Poulenc S.A., Paris, France

[22] Filed: Apr. 30, 1973

[21] Appl. No.: 355,407

[30] Foreign Application Priority Data
May 3, 1972  France.......................... 72.015696

[52] U.S. Cl............. 260/78 A; 424/78; 260/29.2 N
[51] Int. Cl.². ........................................ C08G 69/10
[58] Field of Search ................................ 260/78 A

[56] References Cited
FOREIGN PATENTS OR APPLICATIONS

| | | |
|---|---|---|
| 1,188,013 | 4/1970 | United Kingdom |
| 834,227 | 5/1960 | United Kingdom |
| 822,192 | 10/1959 | United Kingdom |
| 1,221,469 | 2/1971 | United Kingdom |
| 1,218,879 | 1/1971 | United Kingdom |
| 721,067 | 12/1954 | United Kingdom |

OTHER PUBLICATIONS
Chemical Reactions of Polymers, Fettes, 1966 pp. 373–376, 377, 389–391, 465, 407, 472–473.

Primary Examiner—Howard E. Schain
Attorney, Agent, or Firm—Stevens, Davis, Miller & Mosher

[57] ABSTRACT

Modified L-lysine polymers are provided consisting essentially of recurring units of the formula:

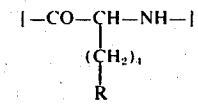

(I)

and recurring units of the formula:

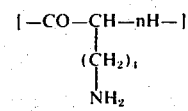

(II)

the total number of recurring units of formula (I) being n and the total number of recurring units of formula (II) being m such that $n + m$ is greater than 50 with the proviso that m can be zero, in which each R radical which may be the same or different, represents one of the following groups: $-NH-SO_3H$; $-NH-(CH_2)_p-SO_3H$ in which $p$ is 1 to 4; $-NH-(CH_2)_2-COOH$; $-NH-CO-CH_2-CH_2OH$; $-NH-CO-(CH_2)_2-SO_3H$; $-NH-CO-NH_2$;

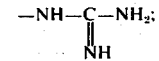

$-OH$ and $-N(CH_3)_2$.

These polymers have better physiological properties than mixtures of L-lysine polymers with other poly($\alpha$-amino acids) and than copolymers of L-lysine and other $\alpha$-amino acids.

5 Claims, No Drawings

SULFONATED POLYMERS DERIVED FROM L-LYSINE

The present invention relates to poly(modified L-lysines).

The very diverse physiological properties of basic α-aminoacid polymers have been known for several years, especially as a result of the original work by KATCHALSKY in this field. It is now known that amongst the homopolymeric poly(basic α-aminoacids), derived from natural α-aminoacids, poly(L-lysine) in which the NH₂ group in the ε-position is separated from the polypeptide chain by 4 methylene groups, possesses, relative to the polymers which carry the NH₂ group closer to the chain, the steric configuration for which the various physiological effects are the most marked. These effects relate especially to:

a. the inhibitition of the enzymatic activity of pepsin over a very wide pH range, particularly for pH's as acid as 1.7,
b. the interaction with muscle phosphorylase-b,
c. the activation of polynucleotide phosphorylase,
d. the inhibition of lipoprotein lipase,
e. the inhibition of cytochrome oxidase with an inhibiting effect on the oxidised form for high concentrations, and, in contrast, an activating effect for low concentrations,
f. an analogous effect to (e) on ATPase,
g. the interaction with plasma albumin,
h. the complexing of natural and artificial nucleic acids with a histone-mimetic effect, the inhibition of the synthesis of ribonucleic acid and the control of the chromosome functions of the living cell,
i. the inhibition of the growth of influenza and smallpox viruses and of Newcastle virus and the protection in vivo of mice and monkeys against poliomyelitis virus,
j. the inactivation of bacteriophages such as the coliphages T2, T4 and T5,
k. an anti-tumor effect with inhibition of EHRLICH tumour and adenocarcinoma TA3,
l. the inhibition of the growth and agglutination of numerous micro-organisms with, consequently, a bacteriostatic and bactericidal effect,
m. the complement fixation,
n. the blood anti-coagulating activity by inhibiting the formation of thrombin coupled with an anti-heparin effect and
o. an aggregating activity towards thrombocytes.

It is known that the intensity and, sometimes, the direction of the properties when opposing effects coexist, are closely connected with the presence and the arrangement of the NH₂ groups which appear on the outside of the poly(L-lysine) molecule, this latter arrangement being related to helicoidal shape due to hydrogen bonding between the hydrogen atoms and oxygen atoms of adjacent peptide links which appear under certain experimental conditions.

A number of the abovementioned properties can be selectively modified, decreased, eliminated or reversed when poly(L-lysine) is accompanied by suitable amounts of poly(aspartic acid) or poly(glutamic acid), which provide carboxyl groups with the opposite electrical charge to that of the ε-amine groups of poly(lysine). However, the physiological effects resulting from the non-stoichiometric neutralisation of the electrical charges are very sensitive to the ionic strength of the medium since salt solutions interpose themselves between the chains of the two polymers and counterbalance the effects originating from the polyelectrolyte character of the polypeptide complex.

Likewise, certain properties vary when the carboxyl groups are provided by the copolymerisation of L-lysine with an α-aminoacid possessing a ω-carboxyl group (glutamic acid or aspartic acid) but, in this case, the properties connected with the helicoidal nature of the polypeptide chain are disturbed by the presence of different units scattered throughout the chain; in effect, if it is considered that the appearance of ionic groups at the outside of the molecule is closely related to the helicoidal form of the molecule, it can be seen that the uniformity of this helix has a great influence on the physiological properties of the molecule.

We have now found, according to the present invention, that it is advantageous to modify the physiological effects described above, not by using a mixture of homopolymers carrying charges of opposite signs which are sensitive to the ionic strength of the medium, and not by copolymerisation of α-aminoacids carrying acids groups in the ω-position which modify the helicoidal structure of the molecule, but by modifying the sidechain NH₂ groups of poly(L-lysine), in desired proportions, by using essentially surface chemical reactions so as to provide antagonistic groups. Amongst the possible reactions, the most advantageous are those which make it possible to introduce either negative charges due to sulphonic acid or carboxylic acid groups, either retaining or eliminating the basicity of the nitrogen, or hydrophilic groups which make it possible to vary the amphipathic character of the molecule.

According to the present invention there is provided an L-lysine polymer consisting essentially of recurring units of the formula:

$$[-CO-CH-NH-] \atop \phantom{xx}(CH_2)_4 \atop \phantom{xxx}R \qquad (I)$$

and recurring units of the formula:

$$[-CO-CH-NH-] \atop \phantom{xx}(CH_2)_4 \atop \phantom{xxx}NH_2 \qquad (II)$$

, the total number of recurring units of formula (I) being $n$ and the total number of recurring units of formula (II) being $m$ such that $n + m$ is greater than 50, preferably greater than 2,000, it being possible for $m$ to be zero, in which each R radical, which may be the same or different, represents:

—NH—SO₃H
—NH—(CH₂)$_p$—SO₃H    with $p = 1$ to 4
—NH—(CH₂)₂—COOH
—NH—CO—CH₂—CH₂OH
—NH—CO—(CH₂)₂—SO₃H
—NH—CO—NH₂

$$-NH-C-NH_2 \atop \phantom{xxx}\| \atop \phantom{xxx}NH$$

—OH or

—N(CH₃)₂

The various groups —R can be formed on the molecule of poly(L-lysine) by applying any known method for converting a —NH₂ group into one of these groups —R.

Thus, for example, the amino group can be sulphonated to give an —NHSO₃H group by reaction with an appropriate sulphonating agent such as a pyridine-sulphuric anhydride complex and it can be converted into an —NH(CH₂)$_p$SO₃H or —NHCO(CH₂)₂SO₃H group by reaction with a sultone or β-sulphopropionic anhydride, respectively. An —NH(CH₂)₂COOH group can be produced by reaction with β-propiolactone under acidic conditions while under basic conditions the —NHCOCH₂CH₂OH group can be produced. An —NH—CO—NH₂ can be produced by reaction with an inorganic isocyanate while an

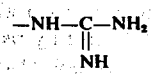

group can be produced by reaction with S-methylisothiouronium sulphate. The —NH₂ group can be substituted by two methyl groups, for example by reaction of the polymer with formaldehyde and formic acid. The amino group can be converted into a hydroxyl group with nitrous acid using, for example, sodium nitrite and hydrobromic acid. Further details of these processes appear from the Examples given below; analogous procedures can, of course, be used.

The nature and the relative proportions of the various groups R can be adjusted in such a way as to provide the desired physiological effect, it being possible to introduce each group independently to a controlled extent, either successively or simultaneously. Furthermore, the poly(L-lysine) can be of any molecular weight provided it contains more than 50 recurring units.

The polymers obtained according to the present invention, which are soluble in an aqueous medium having ionic strength and acidity corresponding to that of living beings (pH approximately 7.35 and ionic strength approximately 0.150 M with respect to NaCl), have a new type of anticoagulant activity which is opposite to that of products of known structure such as heparinoids or hirudinoids. Moreover, the polymers can be rendered insoluble in the form of granules, films and lacquers by intermolecular crosslinking of groups carried in the ε-position, by reaction with an appropriate difunctional compound, or by assisting a reaction of the groups with one another. The soluble products can also be fixed by the same groups onto surfaces which carry reactive sites in order to impart to the said surface the modified physiological properties described above. Amongst the latter, the most valuable concern the compatibility of the surfaces produced with the components mentioned and the proteins and enzymes of blood coagulation systems.

A particularly valuable case is where R = —NH—SO₃H, the controlled introduction of which makes it possible to remove the aggregating activity on thrombocytes whilst maintaining the overall anticoagulant effect.

The poly(modified L-lysines) according to the present invention can thus be used for manufacturing articles or coatings intended to be in contact with physiological liquids. They can also be used for preparing pharmaceutical compositions containing an appropriate pharmaceutical carrier or diluent which can be used in therapy as anticoagulants, analogous to compositions based on heparin.

The following Examples further illustrate the present invention.

EXAMPLE 1

Potassium carbonate (2.7 g.) and propane-sultone (1.22 g.) are added to a solution of poly(L-lysine hydrobromide) (with a degree of polymerisation equal to about 4,000 L-lysine units) (2.3 g.) in water (100 cc.). After heating for 3 hours at 50°C., propane-sultone (a further 1 g.) is added and heating is continued at 50°C. for 8 hours. The solution is then dialysed through a regenerated cellulose membrane against distilled water (10 litres) for 48 hours, and then the polymer is precipitated by adding ethanol and dried. Poly(sulphopropylated L-lysine) (1.0 g.), consisting of 61% of units of formula (II) and 39% of units of formula (I) wherein R is the group of the formula:

is thus obtained.

EXAMPLE 2

The procedure of Example 1 is repeated using 3.75 g. potassium carbonate; the mixture is heated for 5 hours at 50°C. After dialysis, precipitation and drying, poly(sulphopropylated L-lysine) (0.8 g.), consisting of 83% of units of formula (II) and 17% of units of formula (I) wherein R is the group of the formula:

—NH—(CH₂)₃—SO₃H is obtained.

EXAMPLE 3

Following the procedure of Example 2, after the solution has been heated for 5 hours, K₂CO₃ (700 mg.) and propane-sultone (1.22 g.) are added to it, the whole is left at 50°C. for 5 hours; this latter operation is repeated 5 times.

After dialysis, precipitation and drying, completely sulphopropylated poly(L-lysine) (1.0 g.), consisting of 100% of units of formula (I) wherein R is the group

EXAMPLE 4

β-Propiolactone (95 microliters) is added to a stirred suspension consisting of methylene chloride (50 milliliters and lyophilised poly(L-lysine) base (with a degree of polymerisation of 4,000) (0.385 g.) and the whole is stirred for 20 hours at 20°C. The solid material is then filtered off, washed with diethyl ether and dried. A dry product (0.280 g.) is obtained which is stirred for 3 days at ambient temperature in a 0.1N aqueous solution of hydrochloric acid (50 cc.). The solution thus obtained is filtered and then dialysed through a regenerated cellulose membrane against distilled water (10 liters). The portion retained is lyophilised to give the [L-lysine][N-ε-(2-carboxyethyl)-L-lysine] copolymer (0.18 g.), which is soluble in water and consists of 72.5% of units of formula (II) .HCl and 27.5% of units of formula (I) wherein R is the group

—NH(CH$_2$)$_2$COOH.

EXAMPLE 5

Poly(L-lysine hydrobromide) (with a degree of polymerisation of 4,000) (0.45 g.) is dissolved in distilled water (25 cc.), the solution is cooled in a bath to 0°C. and a N aqueous solution of NaOH (2.15 cc.) is run in dropwise, with stirring. β-Propiolacetone (0.27 cc.) is added and the mixture is stirred at ambient temperature for 90 hours. The solution is filtered and then dialysed through a regenerated cellulose membrane against distilled water (10 liters) for 48 hours; the portion retained is then precipitated by adding methanol, washed with diethyl ether and dried.

The [N-ε-(3-hydroxy-propionyl)-L-lysine]-[N-ε-(2-carboxyethyl)-L-lysine] copolymer (0.30 g.), which is soluble in water and consists exclusively of units of formula (I), R being the group —NH—CO—CH$_2$—CH$_2$OH in 75% of the units and the group —NH—(CH$_2$)$_2$—COOH in 25% of the units, is thus obtained.

EXAMPLE 6

Poly(L-lysine hydrobromide) (with a degree of polymerisation of 4,000) (1.05 g.) is dissolved in distilled water (40 cc.), potassium cyanate (0.45 g.) which has been freshly recrystallised from water is added and the whole is stirred for 20 hours at 20°C. The solution is dialysed through a regenerated cellulose membrane against distilled water (10 liters) for 48 hours, and the portion retained is precipitated in methanol and dried.

The polymer [L-lysine]-[ε-ureido-L-norleucine] (0.7 g.), which is soluble in water and consists of 25% of units of formula (II) .HBr and 75% of units of formula (I), R being the group —NH—CO—NH$_2$, is thus obtained.

Under the same conditions, after the potassium cyanate has acted for 20 hours, the addition of potassium cyanate (0.45 g.) is repeated and the mixture is again left for 20 hours at 20°C. After dialysis, precipitation and drying, the polyε-ureido-L-norleucine] obtained contains 100% of units of formula (I), R being the group —NH—CO—NH$_2$.

EXAMPLE 7

A solution of NaNO$_2$ (1.0 g.) in water (20 cc.) is added to a solution of poly(L-lysine hydrobromide) (with a degree of polymerisation of 4,000) (1.045 g.) in a 0.1N aqueous solution of hydrobromic acid (50 cc.) which has been cooled to 0°C.

The mixture is left to react for 20 hours at ambient temperature. The solution is dialysed through a regenerated cellulose membrane against distilled water (20 liters) for 48 hours, and then the retained portion is precipitated in ethanol and dried.

The [L-lysine]-[ε-hydroxy-L-norleucine] copolymer (0.8 g.), consisting of 12% of units of formula (II) .HBr and 88% of units of the formula (I) with R representing the group —OH, is thus obtained.

EXAMPLE 8

Poly(L-lysine hydrobromide) (with a degree of polymerisation of 4,000) (1.254 g.) is dissolved in distilled water (100 cc.).

Sodium tetraborate (Na$_2$B$_4$O$_7$. 10H$_2$O) (6 g.) is added to the limpid solution obtained and then the whole is cooled to 0°C. and the pH adjusted to 9.8 by adding a 1N aqueous solution of NaOH.

A pyridine-sulphuric anhydride complex (2.0 g.) (prepared according to Inorganic Synthesis, II, p. 173) is then added and the mixture is stirred vigorously whilst keeping the temperature at 0°C., and the pH at 9.8 by adding a 0.1N aqueous solution of NaOH. The reaction is complete when all the complex has dissolved and when the pH no longer varies.

The solution is filtered and is dialysed through a regenerated cellulose membrane against distilled water (2 × 10 liters) and then against a N/10 aqueous solution of hydrobromic acid (10 liters) and again against distilled water (2 × 10 liters). The product is then concentrated from 320 cc. to 30 cc. by ultrafiltration through an AMICON XM 100 membrane (retaining the particles greater than 10$^5$ Dalton) and lyophilised. The [L-lysine]-[ε-sulphamino-L-norleucine] copolymer (1.0 g.), consisting of 20% of units of formula (II) and 80% of units of formula (I) with R being —NHSO$_3$H, is thus obtained.

EXAMPLE 9

Lyophilised poly(L-lysine) base (with a degree of polymerisation of 4,000) (1.3 g.) is dissolved in formic acid (100 cc.), with stirring, at ambient temperature.

A 30% strength aqueous solution of formaldehyde (2 cc.) is then added and the whole is heated at 35°C. for 1 hour. 30% formaldehyde solution (a further 2 cc.) is added and heating is continued at 35°C. for 1 hour. Formic acid is driven off in vacuo, and the residue is washed with ethyl ether and taken up in a 1N aqueous solution of NaOH (100 cc.).

After ultrafiltration through an AMICON XM 100 membrane (retaining particles greater than 10$^5$ Dalton) until the pH of the ultrafiltrate is 7, the product is lyophilised.

Poly[ε-dimethylamine-L-norleucine] (1 g.), consisting exclusively of units of formula (I) with R being —N(CH$_3$)$_2$, is thus obtained.

EXAMPLE 10

Following the procedure of Example 8, the pyridine-sulphuric anhydride complex (1.2 g.) is added and the mixture is stirred vigorously whilst keeping the temperature at 0°C. and the pH at 9.8 by adding 1N NaOH solution.

After 2 hours, the addition of the complex (1.2 g.) is repeated and the temperature and the pH are maintained as above. After a further 2 hours, pyridine-sulphuric anhydride complex (1.2 g.) is added for the third time, giving a total of 3.6 g., and the pH is maintained at 9.8 for 2 hours. The mixture is then left to stand for 15 hours at 0°C., and purified as in Example 8 .

Poly(ε-sulphamino-L-norleucine) (1.160 g.), containing 100% of units of formula (I) with R being —NHSO$_3$H, is obtained.

The absence of lysine radicals is verified by dinitrophenylation according to SANGER, Biochem. J., 39, 507 (1945).

EXAMPLE 11

Poly(L-lysine hydrobromide) (with a degree of polymerisation of 4,000) (0.209 g.) is dissolved in distilled water (15 cc.). Sodium tetraborate (Na$_2$B$_4$O$_7$. 10H$_2$O) (0.5 g.) is added to the limpid solution obtained, the whole is then cooled to 0°C., and the pH adjusted to 9.8 by adding N sodium hydroxide solution.

β-Sulphopropionic anhydride (13.6 g.), of the formula:

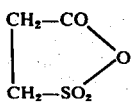

, prepared according to KHARASCH M.S. et al, J. Am. Chem. Soc., 62, 2393 (1940), is then added in 6 equal portions, whilst keeping the temperature at 0°C., and the pH at 9.8 by adding N sodium hydroxide solution (20 cc.).

The reaction is complete when the pH no longer varies.

The limpid solution is then ultrafiltered through an ultrafiltration membrane which retains solutes of molecular weight greater than $10^5$ Daltons. The retained portion is diluted with distilled water until the resistivity of the ultrafiltrate is greater than $10^5 \Omega$ cm.

The retained portion is then lyophilised. The [L-lysine]-[ε-(3-sulpho-propionyl)-L-lysine] copolymer (0.168 g.), containing 75% of units of formula (II) and 25% of units of formula (I) with R representing —NHCO(CH$_2$)$_2$SO$_3$H, is thus obtained.

EXAMPLE 12

Poly(L-lysine hydrobromide) (with a degree of polymerisation of 4,000) (0.209 g.) is dissolved in water (15 cc.). Triethylamine (0.3 cc.) is added dropwise with stirring to the limpid solution obtained, whilst cooling to 0°C. A white gel is obtained.

Sodium 2-hydrazinocarbonyl-ethane-sulphonate monohydrate (4.16 g.) is dissolved in N-hydrochloric acid (50 cc.) at 0°C. Sodium nitrite (3.45 g.) is added in small portions and the mixture is left to react for 30 minutes at 0°C. The excess nitrous acid is then removed under a stream of nitrogen. The limpid solution thus obtained is added to the gel prepared above. The mixture is kept at 0°C. for 1 hour with stirring and the limpid solution obtained is left for 15 hours at 20°C., and then adjusted to pH 13 by adding 10 N sodium hydroxide solution. The product is then purified by ultrafiltration as indicated in Example 11.

After lyophilisation, the [L-lysine]-[ε-(3-sulphopropionyl-L-lysine] copolymer (0.254 g.), consisting of 25% of units of formula (II) and 75% of units of formula (I) with R being —NHCO(CH$_2$)$_2$SO$_3$H, is obtained.

Sodium 2-hydrazinocarbonyl-ethane-sulphonate monohydrate is obtained in the following way:

0.2 M sodium ethylate (500 cc.) is added to β-sulpho-propionic anhydride (13.6 g.) in anhydrous tetrahydrofurane at 0°C. A precipitate is obtained. After washing and drying, sodium 2-ethoxycarbonyl-ethane-sulphonate (20 g.) is obtained.

Hydrazine hydrate (6 cc.) and distilled water (9 cc.) are added to the latter product (11.4 g.) The mixture is heated under reflux for 2 hours and then water (20 cc.) and ethanol (75 cc.) are added, whilst keeping the mixture refluxing. The product crystallises after cooling. After filtration and drying, sodium 2-hydrazinocarbonyl-ethane-sulphonate monohydrate (9.3 g.) is obtained.

EXAMPLE 13

[L-Lysine]-[L-homoarginine] copolymer.

Poly(L-lysine hydrobromide) (with a degree of polymerisation of 4,000) (1.045 g.) followed by sodium tetraborate (Na$_2$B$_4$O$_7$.10H$_2$O) (1.9 g.) are dissolved successively in distilled water (50 cc.) at 20°C.

A 1N aqueous solution of NaOH (12.5 cc.) is then poured in dropwise, with stirring. During this addition, the pH of the solution changes from 9.7 to 10.9., S-Methyl-isothiouronium sulphate (1.0 g.) is added to this homogeneous solution and the whole is heated for 30 minutes at 70°C. with stirring.

The solution is cooled to 20°C. and ultrafiltered through an ultrafiltration membrane which retains solutes of molecular weight greater than $10^5$ Daltons, diluting the retained portion with $10^{-3}$N sodium hydroxide solution until the ultrafiltrate no longer contains any bromide ions and then with distilled water until an ultrafiltrate with a resistivity greater than $10^5 \Omega$ cm is obtained.

On lyophilisation of the retained portion, the [L-lysine]-[L-homoarginine] copolymer (0.825 g.)., consisting of 50% of units of formula (I) and 50% of units of formula (II) with R being

is obtained.

EXAMPLE 14

The following measurements are made on dog plasma containing citrate, in the presence of increasing concentrations of poly(ε-sulphamino-L-norleucine), the preparation of which is described in Example 10. The various data was determined as follows:
thrombin time, according to BIGGS R. M. and MACFARLANE R. G., Blood coagulation and its disorders-Blackwell Scientific Publications — Oxford — 1962,
QUICK time, according to QUICK A. J. J. Biol. Chem., 109, 73 (1935), and
Cephalin-kaolin time, according to LARRIEU M. J. and WEILLAND C. [Rev. Hemat., 12, 2 (1957)].

By way of comparison, the effect of heparin is investigated on this same plasma, using the same techniques. The following Table gives the results obtained.

| Reaction medium investigated | | | Measured coagulation time (seconds) | | |
|---|---|---|---|---|---|
| | | | Thrombin time | Quick time | Cephalin-kaolin time |
| Plasma | containing | citrate. | unmodified | 9.7 | 7.0 | 21.8 |
| " | " | " | poly(ε-sulphamino-L-norleucine) 5 mg/l | 10.6 | | |
| " | " | " | " 30 | 12.6 | 10.0 | 47.2 |
| " | " | " | " 65 | 15.7 | 11.6 | 59.8 |
| " | " | " | " 140 | 21.2 | 12.0 | 75.8 |
| " | " | " | " 310 | 27.8 | | |
| " | " | " | + heparin 0.15 mg/l | 12.3 | | |
| " | " | " | " 0.6 | | | 45.6 |
| " | " | " | " 8 | | 9.9 | |

Regardless of the technique used, it is found that poly($\epsilon$-sulphamino-L-norleucine) causes a marked lengthening of the coagulation time. The anticoagulant action exerted is, at least partially, of the same type as the action of heparin (action on thrombin).

EXAMPLE 15

Rabbit blood (36 cc.) is collected on a 3.8% aqueous solution of sodium citrate (4 cc.) and the whole is centrifuged for 20 minutes at 15°C., and at 90 G. The plasma thus obtained, which is rich in platelets, is centrifuged for 10 minutes at 15°C., and at 1,400 G. The platelet deposit is then washed 3 times with a citrate solution containing glucose (sodium citrate: 760 mg., anhydrous glucose: 120 mg. and physiological serum: q.s.p. 100 cc.) and finally resuspended in Tyrode liquid (4 cc.), containing glucose and albumin [see KINLOUGH = RATHRONE R. L. et al., J. Lab. Clin. Med., 75, 780 (1970)].

The platelet suspension thus obtained (0.6 cc.) is placed in a spectrophotometer cell, Tyrode liquid (2.4 cc.) is added followed, after stirring for 3 minutes, by physiological solution (0.3 cc.) or by a neutral solution of poly(L-lysine) prepared according to G. D. FASMAN et al., J. Am. Chem. Soc., 83, 709 (1961) or of poly($\epsilon$-sulphamino-L-norleucine) (Example 10) in the physiological solution. The optical density at 600 nm is recorded as a function of time, during the 3 minutes which precede, and during the 10 minutes which follow, the addition of the last reagent.

The following Table summarises the results obtained.

| Time of the measurements | Optical density at 600 nm |
|---|---|
| Before the addition of the last reagent | 0.500 |
| 10 minutes after the addition of 0.3 cc. of physiological solution | 0.420 |
| 10 minutes after the addition of 0.3 cc. of poly(L-lysine) of concentration 1.1 g/l | 0.025 |
| 10 minutes after the addition of 0.3 cc. of poly($\epsilon$-sulphamino-L-norleucine) of concentration 2.2 g/l | 0.415 |

At a concentration of 1.1 g/l, poly(L-lysine) thus causes very great aggregation of the platelets. In contrast, poly($\epsilon$-sulphamino-L-norleucine) has absolutely no action on these platelets, even at a concentration of 2.2 g/l.

EXAMPLE 16

Under conditions similar to those of Example 14, the QUICK time is determined for dog plasma containing citrate, in the presence of increasing concentrations of [L-lysine]-[N$\epsilon$-(2-carboxyethyl)-L-lysine] copolymer, the preparation of which is described in Example 4. The following values are obtained:

| Plasma containing citrate, | unmodified | | 7.4 seconds |
|---|---|---|---|
| " | " + product of Example 4 | 27.5 mg/l | 8.2 |
| " | " | 55 | 10.4 |
| " | " | 82.5 | 11.4 |
| " | " | 110 | 13.6 |
| " | " | 137.5 | 17.5 |
| " | " | 165 | 23.6 |
| " | " | 206 | 30.0 |
| " | " | 275 | 40.6 |

We claim:

1. A modified L-lysine homopolymer consisting essentially of recurring units of the formula:

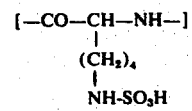

and recurring units of the formula:

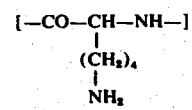

the total number of recurring units of formula (I) being $n$ and the total number of recurring units of formula (I) being $m$ such that $n + m$ is greater than 5 with the proviso that $m$ can be zero.

2. A process for preparing a modified L-lysine homopolymer as defined in claim 1 which comprises reacting an L-lysine homopolymer having more than 50 recurring units with a reagent capable of reacting with an $\epsilon$-NH$_2$ group of lysine to convert it into an —NH—SO$_3$H.

3. A modified L-lysine homopolymer according to claim 1 in which $n + m$ is greater than 2,000.

4. A modified L-lysine homopolymer according to claim 1 which has been cross-linked via the $\epsilon$-position.

5. An article or coating of a modified L-lysine homopolymer as defined in claim 1.

* * * * *